(12) United States Patent
Ferguson

(10) Patent No.: US 6,177,486 B1
(45) Date of Patent: Jan. 23, 2001

(54) LAMELLAR PIGMENT PARTICLE DISPERSION

(75) Inventor: Russell L. Ferguson, Tamaqua, PA (US)

(73) Assignee: Silberline Manufacturing Co., Inc., Tamaqua, PA (US)

( * ) Notice: Under 35 U.S.C. 154(b), the term of this patent shall be extended for 0 days.

(21) Appl. No.: 09/063,247

(22) Filed: Apr. 20, 1998

Related U.S. Application Data

(62) Division of application No. 08/806,514, filed on Feb. 24, 1997, now Pat. No. 5,773,492.

(51) Int. Cl.⁷ ............................... C09D 5/00; C08K 3/00
(52) U.S. Cl. ......................... 523/161; 523/171; 524/440; 524/441
(58) Field of Search .................................. 523/161, 171; 524/440, 441

(56) References Cited

U.S. PATENT DOCUMENTS

| | | |
|---|---|---|
| 4,081,423 | 3/1978 | Hardenfelt . |
| 4,517,320 | 5/1985 | Bäbler et al. . |
| 5,104,922 * | 4/1992 | Chang .................................. 524/441 |
| 5,849,072 | 12/1998 | Sommer et al. ..................... 106/403 |

FOREIGN PATENT DOCUMENTS

| | | |
|---|---|---|
| 0 101 668 | 2/1984 | (EP) . |
| 0 154 679 A2 | 9/1985 | (EP) . |
| 2 165 828 | 10/1985 | (GB) . |
| WO 94/28074 | 12/1994 | (WO) . |

OTHER PUBLICATIONS

Copy of European Search Report for 98400389.7–2102.
Rotovario Dispersion Product Information Sheets; 14 pages; Oct. 1997.

* cited by examiner

Primary Examiner—Edward J. Cain
(74) Attorney, Agent, or Firm—Merchant & Gould P.C.

(57) ABSTRACT

Lamellar pigment particles are provided in a form that is readily used for coating compositions by use of a dispersion. The dispersion contains the pigment particles in an amount of 20–55% by weight, and also includes a carrier that is compatible with the vehicle of the intended coating composition. The dispersions are stable and provide essentially complete separation of the lamellar pigment particles.

15 Claims, No Drawings

LAMELLAR PIGMENT PARTICLE DISPERSION

This application is a Divisional of application Ser. No. 08/806,514, filed Feb. 24, 1997, now U.S. Pat. No. 5,773,492.

BACKGROUND OF THE INVENTION

The present invention is directed to dispersions of lamellar pigment particles that are useful in forming coating compositions, i.e. metal pigment-containing paints, mica-containing paints and others. Such paints are used, for example, for coatings in the automotive, plastics, can coatings, and coil coatings industries, and for forming metallic coatings for roofs and other similar structural surfaces. The particles generally are used in a flake like form.

Typically, in order to avoid stability problems and decrease shipping costs, the lamellar pigment particles for use in such coating compositions have been provided to the customer (i.e. a paint manufacturer or ultimate end user) in the form of a highly concentrated paste. The paste is then mixed with a suitable vehicle for forming the final coating composition.

However, in practice it has been difficult for the paint manufacturer or end user to form a paint with the pigment paste, especially with the finer grade pigment pastes. It has been time-consuming and relatively labor intensive to ensure that the paste is completely mixed with the paint vehicle. In addition, the difficulty in mixing the paste with the vehicle has resulted in the use of relatively severe mixing techniques that can damage the metal flakes, e.g. by bending, curling or tearing. Generally, the paste will be added to a tank containing the paint vehicle or some component thereof. As the paste is added, the mixture is stirred with a propeller or Cowles blade or the like. Such procedures are not effective in separating the particles in the paste and can result in the damage to the particles discussed above, and also requires additional processing such as filtration to remove undispersed particles. This causes problems such as batch-to-batch inconsistency and less desirable aesthetic properties. It also has been found that the paste can be difficult to remove from bulk containers such as drums.

SUMMARY OF THE INVENTION

The present invention seeks to overcome the disadvantages associated with the use of lamellar pigment pastes for forming coating compositions. In accordance with the present invention, the lamellar pigment particles are provided in the form of a dispersion containing 20–55% by weight of lamellar pigment particles. The dispersion also includes a carrier that is liquid at room temperature and is compatible with a vehicle for forming a coating composition. The lamellar pigment particles are dispersed in the carrier and preferably are capable of remaining in a dispersed state in the dispersion without separation indefinitely when stored at ambient temperatures, although in some cases a soft settling of the particles after two weeks or so may occur, which is acceptable.

The dispersion of the present invention is easily mixed with a vehicle for a coating composition, thereby reducing the time and labor needed to formulate the coating composition. In addition, since less severe mixing techniques can be used, the damage to the pigment particles can be reduced, thereby improving consistency and aesthetic properties. The demands on equipment will be lessened, and less equipment time will be needed to make batch adjustments. The dispersion can be readily removed from bulk containers such as drums. In addition, the dispersion of the present invention can improve shelf stability as opposed to a paste form, especially for non-leafing grades that are coated with unsaturated fatty acids. Shelf stability is largely dependent on the exposure of the pigment particles to air. This exposure will cause solvent evaporation and oxidation of the lubricant, resulting in flake agglomeration. Dispersions will further help to exclude air, thus maintaining the integrity of the pigment.

DETAILED DESCRIPTION

The present invention provides a lamellar pigment particle dispersion useful for forming coating compositions when mixed with a suitable vehicle. The preferred lamellar pigment is aluminum, although other lamellar pigments such as zinc, bronze, iron, pearlescent and graphite flakes can be used if desired. The present invention is particularly useful for relatively fine flakes, especially of aluminum, e.g. those having a median particle size of about 100 microns or less, especially 10 microns or less, since such particles have a relatively high surface area and can be difficult to mix with a paint vehicle in the paste form.

The pigment particles can be in the form of leafing grades or non-leafing grades, although the present invention may be particularly advantageous with the non-leafing grades, whose fatty acid coatings tend to render such particles more susceptible to oxidation and agglomeration in the form of "cold welding" to form undesirable seeds. When the pigment particles are in the dispersion of the present invention, the particles are further separated and are protected to some extent by the presence of the dispersion carrier.

The amount of lamellar pigment solids in the dispersion is 20–55% by weight, preferably 40–50%. Lower amounts may be difficult to hold in suspension, while higher amounts may tend to form a composition that is too paste-like.

The dispersion also includes a dispersion carrier. The dispersion carrier should be compatible with the lamellar pigment particles. It also should be compatible with the vehicle of the coating composition with which it will be used. Thus, some dispersion carriers will be selected for use with aqueous coating composition vehicles, while others can be used for organic solvent coating composition vehicles.

In general, the dispersion carrier can be selected from plasticizers, solvents, resins and oils. Specific examples of the resins include thermosetting acrylic resins, thermoplastic acrylic resins, alkyd resins, epoxy resins, polyester resins, hydrocarbon resins, melamine resins, phenolic resins, polyamide resins, silicone resins, styrene resins, urea resins, urethane resins, and vinyl resins. Specific examples of the plasticizers include phthalates such as dioctyl phthalate, diisodecylphthalate and butyl benzyl phthalate, adipates such as diisobutyl adipate and diisodecyl adipate, phosphates such as tricresyl phosphate and trioctyl phosphate, polymeric plasticizers such as polyester and polyester adipate plasticizers, epoxy plasticizers such as epoxidized soy bean oil and epoxidized octyl oleate, citrates such as triethyl citrate, glycols such as butyl phthalyl butyl glycolate, and sebacates such as disebacate. Specific examples of the solvents include, substituted and unsubstituted aliphatic and aromatic hydrocarbons, for example having up to twenty carbon atoms, and oxygen-containing solvents such as ketones, alcohols, glycol ethers, esters and nitroparaffins, for example containing up to twenty carbon atoms. Specific examples of the oils include animal, vegetable and synthetic oils such as linseed oil, tung oil, castor oil, fish oil, rapeseed oil, oticica oil and soya bean oil, fatty acids and others.

The carrier also can be provided with rheology agents. Examples include montmorillonites, attapulgites, pyrogenic silicas, hydrogenated castor oils, high molecular weight polyolefins, calcium sulfonates and polyamides.

The viscosity of the dispersion is generally in the range of about 4,000–200,000 centipoise, preferably 10,000–90,000 centipoise, as measured on a Brookfield RVT viscometer using a number 7 spindle at 5 rpm.

The dispersion of the present invention shows stability. That is, the lamellar pigment particles will remain dispersed and not separate upon standing. For the purposes of the present invention, it is considered that the dispersion shows sufficient stability if it does not separate to form a compacted layer of lamellar pigment particles on the bottom and a clear (i.e. free from lamellar pigment particles) layer of carrier at the top, upon standing for about one year at ambient temperature.

The lamellar pigment particles should be completely separated with the liquid dispersion carrier in the dispersion. Therefore, it is preferred to form the dispersion using mixing equipment that provides good slow speed shear to the mixture with minimum damage to the pigment flakes. More specifically, it is desired to use a mixer that agitates the entire contents of the mix with a folding action. The blades of these devices can be oriented vertically or horizontally, but will have close tolerances to the bottom and sidewalls of the mixing tank in order to reduce the build up of undispersed particles. The equipment should also have variable speed, e.g. up to 200 rpm, and should be capable of low speed operation, e.g. 3–25 rpm. Other types of mixing equipment may be used, but might not be as efficient and might damage the pigment particles.

Double planetary mixers are especially useful. For such devices, the blade speed (i.e. the rate of rotation for each blade around its own axis) will be about 5–35 rpm, preferably 12 rpm. The orbital speed (i.e. the rate at which the blades rotate around the circumference of the mixing vessel) will be about 3–25 rpm, preferably 10 rpm. For mixers without double planetary features, the orbital speed will be about 3–25 rpm, preferably 10 rpm. Examples of mixing devices useful for the purposes of the present invention include the PLM-5 double planetary and PLM 150 double planetary available from Premier of Reading, Pa., the 550 series mixers including the R550/500 and AG550/500 available from Myers Engineering of Bell, Calif., and the HDM-25 and HDM-200 available from Ross Engineering of Savannah, Ga.

To form the present dispersions, it is desirable first to add the lamellar pigment particles, e.g. in the form of a paste, to the mixing device. This is followed by incremental additions of the dispersion carrier to the mixing device while mixing at a slow speed such as 3–25 rpm. It is preferred that no more dispersion carrier than about one fourth of the weight of lamellar pigment particles be added for the first mixing. The mixing after the first addition of the dispersion carrier should be carried out until the lamellar pigment particles are completely wetted. If the particles are not completely wetted, agglomerates or clumps of flakes sticking together may form, which will be difficult to disperse completely in subsequent additions of dispersion carrier.

It is desirable for the lamellar pigment particles to be essentially completely dispersed and separated in the dispersion. This can be evaluated in several different ways. In one method, 10 grams of a solids dispersion is gently mixed with 150 grams of a compatible solvent. The slurry obtained is then passed over a 325 mesh screen. if no discernible lumps are seen on the screen, the separation can be considered complete. In another method, the dispersion is reduced to a solids level of 10% with a suitable solvent or vehicle. A wire-wrapped rod or Bird applicator is used to drawdown the resulting paint on a Morest Chart or glass panel. If no visible lumps or seeds are seen in the drawdown, the separation can be considered complete. In a third method, the paint obtained in the second method can be evaluated with a Hegman grind gauge to determine the quality of the dispersion. While the readings for an acceptable dispersion may vary depending on the type of paint and size of the metal pigment particles, typically a Hegman reading of 7 or less will indicate an acceptable result for most coatings.

The dispersion of the present invention can be packaged in cans or drums for delivery to the end user for formulation into a coating composition. The dispersion can be used, and in fact in most cases will be used more easily, with equipment currently used for handling pigment pastes.

The dispersion of the present invention can be "let down", i.e. formed into a coating composition by mixing with additional coating composition components, e.g. vehicle or resin, solvents, etc. On a small scale, this can be accomplished manually using a spatula or similar stirring device. On a large scale, a propeller-type mixer can be used. In such a case, relatively low speeds such as 100–400 rpm can be used.

The present invention will be further illustrated in the following non-limiting examples.

EXAMPLE 1

To a Premier double planetary mixer with vertical blades and a three gallon (11 liter) mixing tank is added 2000 grams of Super Fine "P" Aluminum Paste (median particle size 7 microns) available from Silberline Manufacturing Co., Inc., of Tamaqua, Pa. 200 grams of linseed oil are added slowly while the blades are rotating at 12 rpm with an orbital speed of 10 rpm. The paste/linseed oil mixture is blended for 25 minutes or until the appearance is homogenous. Any paste clinging to the tank walls or blades is scraped into the mixed mass during mixing. Upon completion of the mixing, subsequent additions of 300 and 380 grams of linseed oil are made, following the same mixing parameters. The resultant dispersion has a metal solids content of 50% by weight and a viscosity in excess of 15,000 centipoise. The metal pigment particles are completely separated and the dispersion is stable.

EXAMPLE 2

Using the same equipment as in Example 1, 2000 grams of Super Fine "N" Aluminum Paste available from Silberline Manufacturing Co., Inc. (median particle size 5.5 microns) is added to the tank. 300 grams of "Cymel 303" (a melamine resin available from Cytel Industries of West Patterson, N.J.) is added while the blades are rotating at 12 rpm with an orbital speed of 10 rpm. The mixture is blended for 25 minutes or until the appearance is homogenous. A second and third addition of 600 grams of Cymel 303 resin each are made with additional mixing of twenty minutes each time. This is followed by a fourth addition of 500 grams of Cymel 303 along with 600 grams of xylol and 300 grams of butanol with 15 minutes mixing. The resultant dispersion has a metal solids content of 26.5% by weight and a viscosity of 2000 centipoise. The metal pigment particles are completely separated and the dispersion is stable.

EXAMPLE 3

The dispersion of Example 1 can be used to form a paint composition with a cumarone indene resin, mineral spirits and cobalt drier as follows.

A. Into a heated 20 liter mixing tank are added 3500 g linseed oil and 5000 g cumarone indene resin (CUMAR R-12, available from Neville Chemical Company, Pittsburgh, Pa.). The resin and linseed oil are heated under agitation to solubilize the cumarone indene. After cooling, add, under continual stirring with a Lightning mixer at 150–200 rpm 3000 g of Varsol 1 (mineral spirits, available from Exxon), and slowly add 960 g of the dispersion of Example 1, while continuing stirring. Mixing is carried out for 15–20 minutes to ensure complete homogenization. To this mixture is added, with stirring, 4150 g of Varsol 1, 750 g of Aromatic 100 (a high aromatic naphtha-type solvent, available from Exxon) and 80 g 6% Cobalt (6% cobalt naphthenate drier, available from Troy Corporation, East Hanover, N.J.). The final paint is mixed for 15–20 minutes to ensure homogeneity. The paint had a non-volatile content of 53% by weight, an aluminum content of 2.75% by weight and a pigment/binder content of 5.45% by weight. The aluminum flakes are essentially undamaged by the formulation process.

B. Into a heated 20 liter mixing tank are added 2380 g linseed oil and 2080 g Nevchem 120 (hydrocarbon resin, available from Neville Chemical Company, Pittsburgh, Pa.). The hydrocarbon resin and linseed oil are heated under agitation to solubilize the rein. The mixture is allowed to cool and 3500 g Varsol 1 are added with stirring. Mixing is carried out for 10 minutes, and 2880 g of the aluminum dispersion of Example 1 are added slowly. After mixing for an addition 15 minutes to ensure homogeneity, 3280 g of Varsol 1 and 490 g of 6% Cobalt are added with stirring. Mixing is carried out for an additional 15–20 minutes to ensure homogeneity, and the aluminum flakes are essentially undamaged by the formulation process.

Hegman grind gauge readings are taken on each paint to ensure that the aluminum flake has been completely dispersed and mixed. A reading of 6–7 is acceptable, and the paints then can be spray-applied for any needed final testing or evaluation.

EXMPLE 4

The dispersion of Example 2 can be formulated into a paint composition as follows. 78.2 kg of Chempol 11-2339 (high solids polyester resin, available from Cook Composites and Polymers, Port Washington, Wis.), 12.7 kg of methyl amyl ketone and 12.7 kg of Cymel 303 are blended together. To the above blend is added, with continual stirring, 51.4 kg of the dispersion of Example 2, 6.8 kg of xylol, 4.5 kg of methyl amyl ketone and 3.6 kg of butanol. 1.9 kg of Nacure 1051 (catalyst for the Chempol resin, available from King Industries, Norwalk, Conn.) and 7.3 kg of butanol are preblended and added to the mixture. Then 0.4 kg of BYK 306 (a flow and levelling agent, available from BYK-Chemie USA, Wallingford, Conn.) is added, and mixed for 20 minutes to ensure homogeneity. The resultant paint has a non-volatile content of 70.28% by weight, an aluminum content of 5.80% by weight and a pigment/binder content of 12.00% by weight.

Hegman grind gauge readings are taken on the paint to ensure that the aluminum flake has been completely dispersed and mixed. A reading of 6–7 is acceptable, and the paint then can be spray-applied for any needed final testing or evaluation.

COMPARATIVE EXAMPLE 1

880 grams of resin and solvent are added to a standard 3 gallon (11 liter) mix tank provided with a "Lightning Mixer" (a motor attached to a shaft with a propeller mixing blade). 2000 grams of Super Fine "P" Aluminum Paste are added slowly as the mixer turns at 600 rpm. The slurry is mixed for two hours, after which additional solvent or resin is added to complete the paint. The sample of the paint had seeds and undispersed lumps of aluminum paste that needed to be filtered out.

While a detailed description of the present invention has been provided above, the present invention is not limited thereto, and modifications not departing from the spirit and scope of the present invention will be apparent to those skilled in the art. The invention is defined by the following claims.

What is claimed is:

1. A method of forming a lamellar pigment dispersion suitable for forming a coating composition, comprising:
    adding lamellar pigment particles to a mixing device;
    adding a dispersion carrier to the mixing device, the dispersion carrier being compatible with a vehicle for a coating composition;
    mixing the pigment particles and dispersion carrier so that the pigment particles are completely wetted with the dispersion carrier; and
    adding and mixing additional dispersion carrier, to form a dispersion containing 20–55% by weight of the lamellar pigment particles, the pigment particles remaining dispersed in the dispersion without separation upon standing for one year at ambient temperature.

2. The method of claim 1, wherein no more than about one fourth of the total amount of dispersion carrier used in the dispersion is added to the mixing device in the first addition.

3. The method of claim 2, wherein the mixing device is a device that mixes through a folding action.

4. The method of claim 3, wherein the mixing device is of variable speed up to 200 rpm, and the first mixing step is carried out at no more than 25 rpm.

5. The method of claim 1, wherein the dispersion has a viscosity of about 4,000–200,000 centipoise when measured on a Brookfield RVT viscometer using a number 7 spindle at 5 rpm.

6. The method of claim 1, wherein the dispersion carrier is at least one selected from the group consisting of plasticizers, solvents, resins, oils and rheology agents.

7. The method of claim 1, wherein the dispersion carrier is at least one selected from the group consisting of thermosetting acrylic resins, thermoplastic acrylic resins, alkyd resins, epoxy resins, polyester resins, hydrocarbon resins, melamine resins, phenolic resins, polyamide resins, silicone resins, styrene resins, urea resins, urethane resins, and vinyl resins.

8. The method of claim 1, wherein the dispersion carrier is at least one plasticizer selected from the group consisting of phthalates, adipates, phosphates, polymeric plasticizers, epoxy plasticizers, citrates, glycols, and sebacates.

9. The method of claim 1, wherein the dispersion carrier is at least one solvent selected from the group consisting of substituted and unsubstituted aliphatic and aromatic hydrocarbons, ketones, alcohols, glycol ethers, esters and nitroparaffins.

10. The method of claim 1, wherein the dispersion carrier is at least one oil selected from the group consisting of animal and vegetable oils and fatty acids.

11. The method of claim 1, wherein the dispersion carrier comprises a rheology agent selected from the group consisting of montmorillonites, attapulgites, pyrogenic silicas, hydrogenated castor oils, high molecular weight polyolefins, calcium sulfonates and polyamides.

12. The method of claim 1, wherein the median particle size of the lamellar pigment particles is 100 microns or less.

13. The method of claim 12, wherein the median particle size of the lamellar pigment particles is 10 microns or less.

14. The method of claim 1, wherein the lamellar pigment particles are present in the dispersion in a state essentially free from agglomeration.

15. A method of forming a coating composition, comprising:

preparing a dispersion of lamellar pigment particles according to the method of claim 1; and mixing the dispersion of lamellar pigment particles with a coating composition vehicle.

* * * * *